United States Patent
Sequeira De Oliveira

(10) Patent No.: US 11,413,553 B1
(45) Date of Patent: Aug. 16, 2022

(54) STRUCTURAL PARTS KIT FOR FORMATION OF ARCHITECTURAL AND STRUCTURAL DIDACTIC MODELS

(71) Applicant: Marcio Sequeira De Oliveira, São Paulo (BR)

(72) Inventor: Marcio Sequeira De Oliveira, São Paulo (BR)

(*) Notice: Subject to any disclaimer, the term of this patent is extended or adjusted under 35 U.S.C. 154(b) by 0 days.

(21) Appl. No.: 17/170,340

(22) Filed: Feb. 8, 2021

(51) Int. Cl.
*A63H 33/04* (2006.01)
*A63H 33/06* (2006.01)

(52) U.S. Cl.
CPC ......... *A63H 33/044* (2013.01); *A63H 33/046* (2013.01); *A63H 33/062* (2013.01)

(58) Field of Classification Search
CPC ............ A63H 33/10–12; A63H 33/046; A63H 33/06; A63H 33/044; A63H 33/42
USPC ..................................... 446/85, 476
See application file for complete search history.

(56) References Cited

U.S. PATENT DOCUMENTS

| | | | | |
|---|---|---|---|---|
| 249,448 A | * | 11/1881 | Barnes ............... | A63H 33/04 446/124 |
| 1,433,273 A | * | 10/1922 | Graves ............... | A63H 33/107 446/109 |
| 1,530,611 A | * | 3/1925 | Parker ............... | A63H 33/107 446/123 |
| 1,837,553 A | * | 12/1931 | Key ............... | A63H 33/101 446/104 |
| 1,980,332 A | * | 11/1934 | Gottschalk ............... | A63H 33/107 446/111 |
| 2,070,887 A | * | 2/1937 | Dunn, Jr. ............... | A63H 33/42 446/109 |
| 2,197,578 A | * | 4/1940 | Darnell ............... | A63H 33/101 446/123 |
| 2,442,526 A | * | 6/1948 | Wright ............... | A63H 33/42 446/4 |

(Continued)

FOREIGN PATENT DOCUMENTS

| BR | 0303779-7 | 4/2005 |
|---|---|---|
| CN | 105243185 | 1/2016 |

(Continued)

*Primary Examiner* — Eugene L Kim
*Assistant Examiner* — Matthew B Stanczak
(74) *Attorney, Agent, or Firm* — B. Aaron Schulman, Esq.; Stites & Harbison, PLLC

(57) ABSTRACT

A kit of structural parts connected by magnets is provided for the assembly of various architectural and structural models that simulate the behavior of cable structures, to understand different structural concepts. The kit includes an instruction manual, plates and other structural parts that facilitate the learning of the concepts through tactile and visual methods. Experimenting with various models allows a user to learn about the behavior of the structures. The structural parts include i) metal cables formed by multiple spherical and hollow elements connected to each other by rods with limiters; ii) cable clip elements with upper openings to receive the spherical elements; (iii) cable connecting parts having two linearly movable parts that enable extension or retraction of the cable connecting parts; (iv) bar stiffeners for high deformation bars to form rigid elements; (v) a cable cutter; and (vi) multiple cable clip parts for receiving multiple cables.

36 Claims, 13 Drawing Sheets

(56) References Cited

U.S. PATENT DOCUMENTS

| | | | | |
|---|---|---|---|---|
| 2,970,388 | A * | 2/1961 | Yonkers | G09B 23/26 434/277 |
| 3,077,696 | A * | 2/1963 | Barnett | A63H 33/046 446/92 |
| 3,355,837 | A * | 12/1967 | Pedersen | A63H 33/12 446/94 |
| 3,502,091 | A * | 3/1970 | Corbin | E04H 15/42 135/97 |
| 3,766,932 | A * | 10/1973 | Sidis | E04B 1/3441 135/147 |
| 3,896,582 | A * | 7/1975 | Cohen | A63H 33/044 446/85 |
| 4,080,925 | A * | 3/1978 | Moore | G01P 5/02 116/173 |
| 4,096,658 | A * | 6/1978 | Neuhierl | A63H 19/34 446/119 |
| 4,259,790 | A * | 4/1981 | Borisof | A63H 33/14 428/187 |
| 5,433,549 | A * | 7/1995 | McGaffigan | A63H 33/042 403/170 |
| 6,478,649 | B1 * | 11/2002 | Hoback | A63H 33/06 446/126 |
| 6,869,246 | B2 * | 3/2005 | Bridgers | F16B 7/048 135/122 |
| 6,892,744 | B2 * | 5/2005 | Feldpausch | E04H 15/001 135/114 |
| 6,945,839 | B2 * | 9/2005 | Quercetti | A63H 18/06 104/123 |
| 7,357,004 | B2 * | 4/2008 | Winston | A44C 5/08 63/15.45 |
| 8,257,088 | B1 * | 9/2012 | Askins | A63B 21/0414 434/247 |
| 9,283,491 | B2 * | 3/2016 | Pope-Gusev | A63H 33/101 |
| 10,905,967 | B1 * | 2/2021 | Satok-Wolman | A44C 13/00 |
| 10,937,335 | B2 | 3/2021 | Sequeira De Oliveira | |
| 2004/0253902 | A1 * | 12/2004 | Sinisi | A63H 33/101 446/85 |
| 2006/0019221 | A1 * | 1/2006 | Cain | G09B 25/04 434/72 |
| 2006/0183406 | A1 * | 8/2006 | Peralta | G09B 25/04 446/476 |
| 2008/0003917 | A1 * | 1/2008 | Norman | A63H 3/04 446/97 |
| 2008/0009218 | A1 * | 1/2008 | Balanchi | A63H 33/044 446/85 |
| 2009/0093182 | A1 * | 4/2009 | Jacobs | A63H 33/008 446/120 |
| 2010/0285718 | A1 * | 11/2010 | Stone | A63H 33/108 446/124 |
| 2014/0227025 | A1 * | 8/2014 | Giveans | G09B 25/00 403/291 |
| 2015/0321111 | A1 * | 11/2015 | Samlaska | A63H 33/106 446/124 |
| 2018/0209474 | A1 * | 7/2018 | Klein | F16B 7/04 |
| 2019/0197918 | A1 | 6/2019 | Sequeira De Oliveira | |

FOREIGN PATENT DOCUMENTS

| | | |
|---|---|---|
| CN | 108665547 | 10/2018 |
| MU | 8602813-8 | 1/2008 |

* cited by examiner

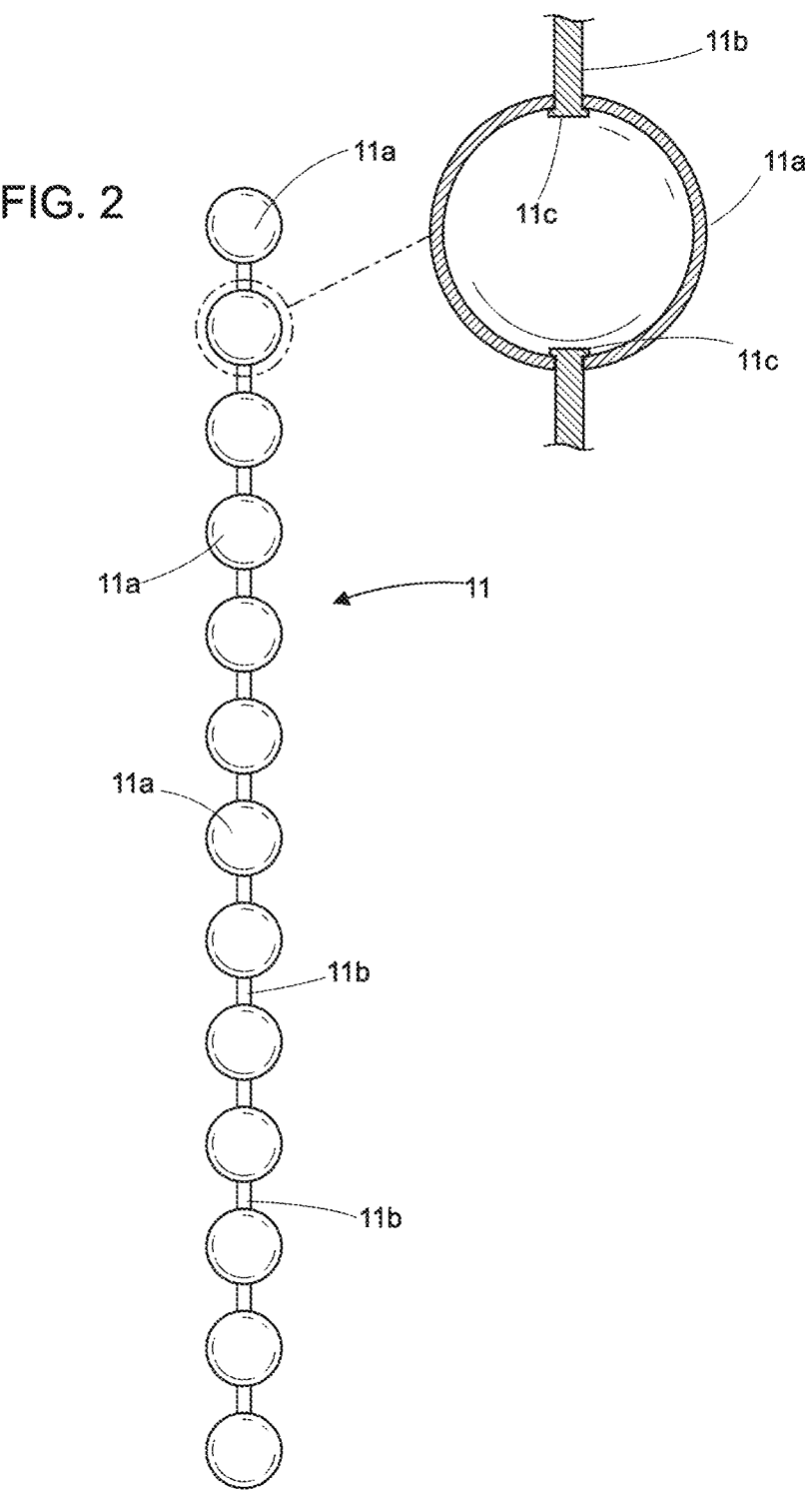

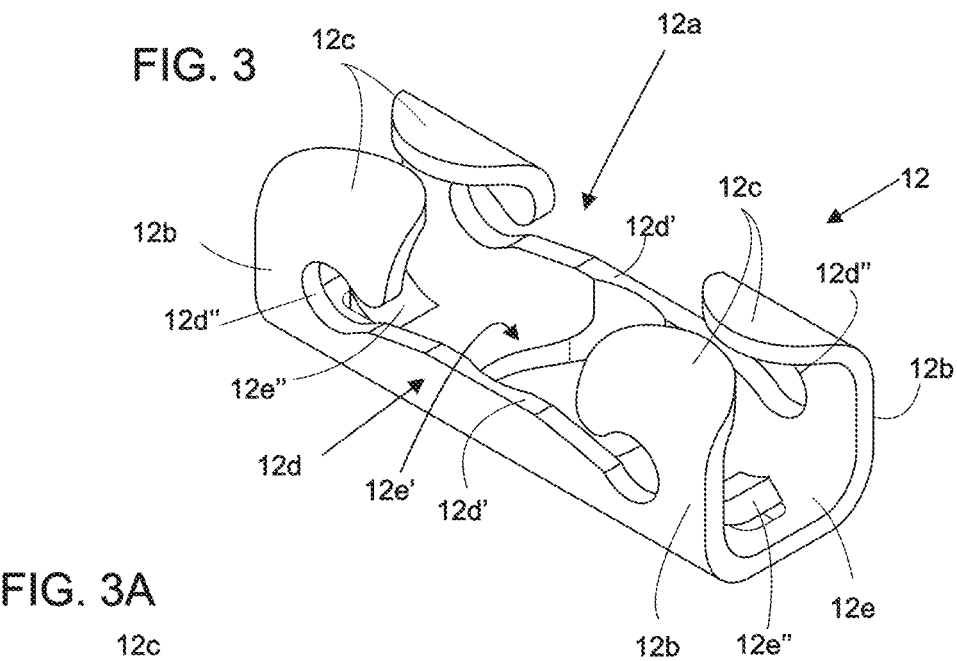
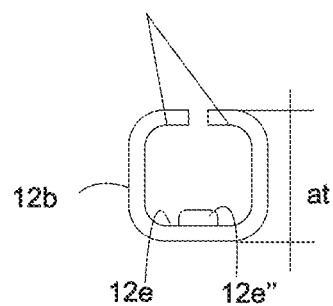
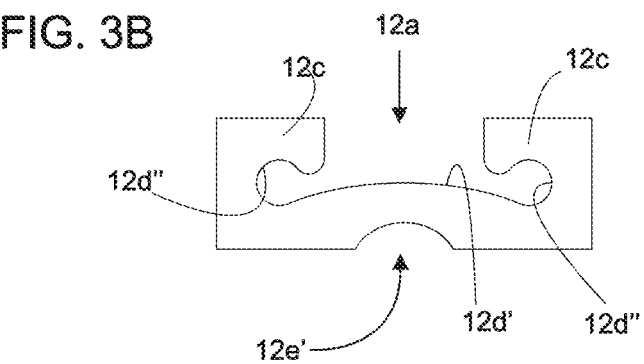
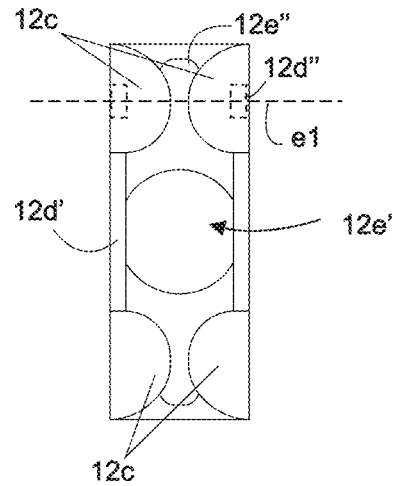

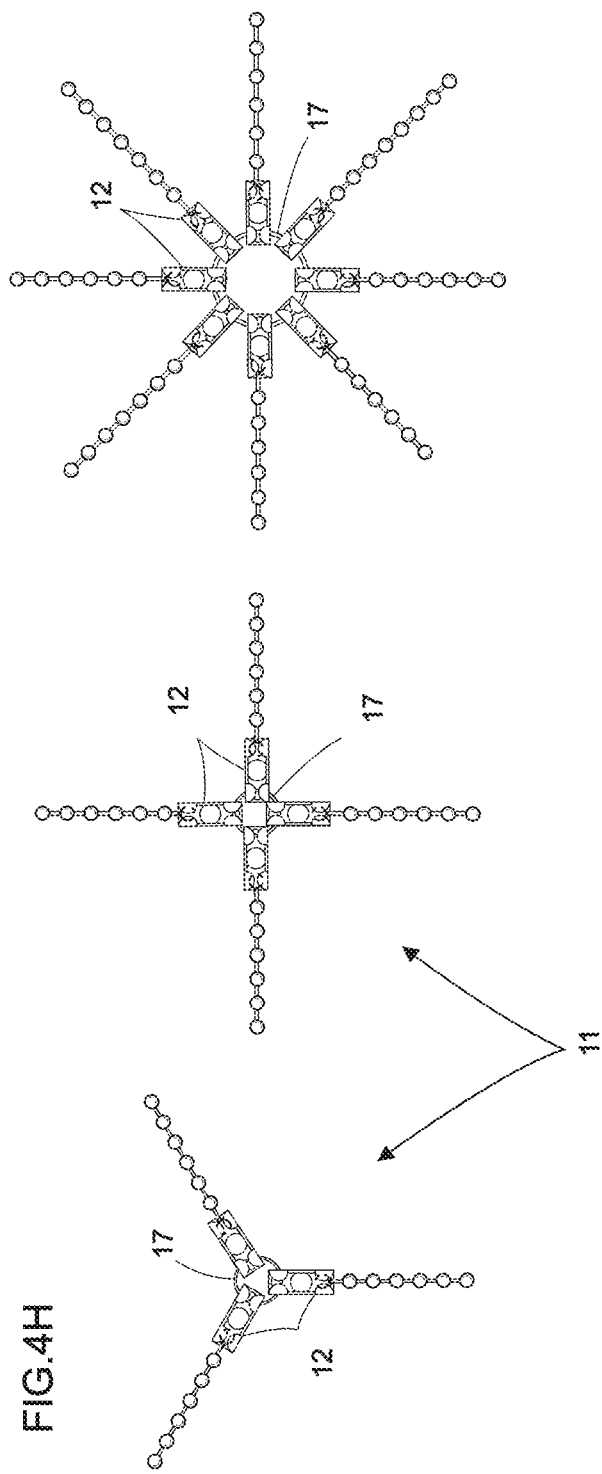

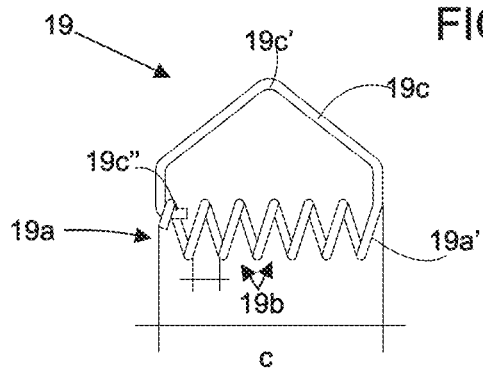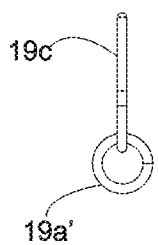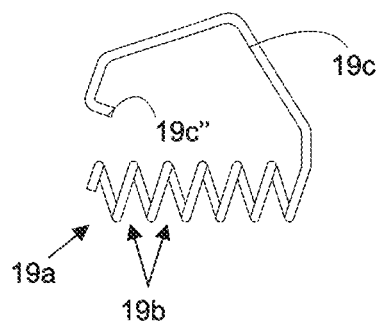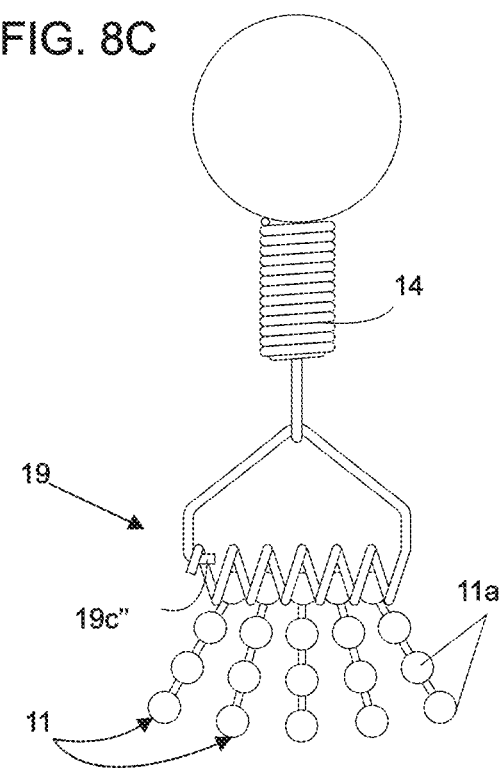

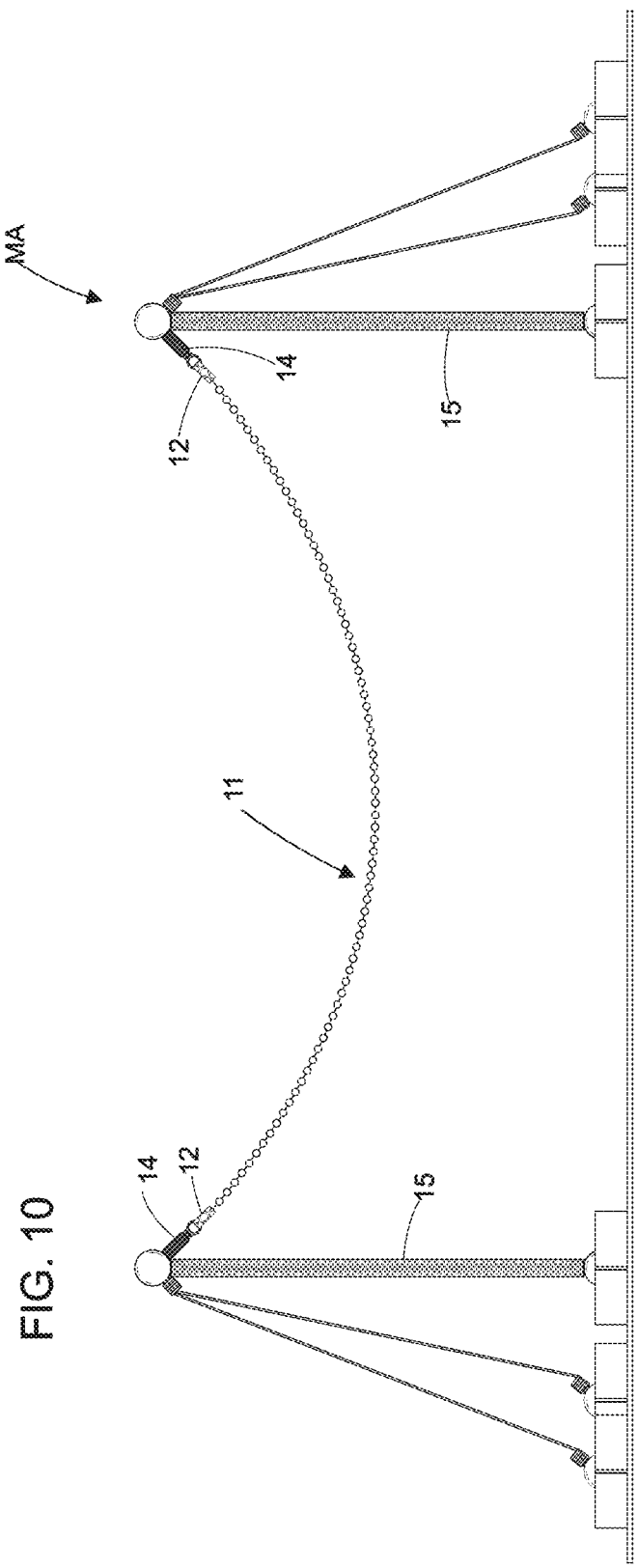

STRUCTURAL PARTS KIT FOR FORMATION OF ARCHITECTURAL AND STRUCTURAL DIDACTIC MODELS

FIELD OF THE INVENTION

This invention relates to a structural parts kit for the formation of didactic architectural and structural models where, notably, the structural parts allow the execution of practical activities for the understanding of abstract structural concepts in a tangible and concrete way through the simulation of the behavior of real structures. This kit presents a set of structural parts, particularly in the form of cables, connections and stiffeners. These structural parts enable the exploration and simulation of cable structures such as stayed structures, overhead bridges, cable mesh, tensegrity structures, and other types of structural systems, thus promoting greater versatility and greater creativity to the user to find diverse structural solutions.

BACKGROUND OF THE INVENTION

It is well known that intuitive knowledge of structural behavior is essential for professionals and students of architecture and engineering, specifically in the early stages of a construction project.

Nowadays, teaching institutions have methodologies for the study of structures based on theoretical and abstract concepts that, for the analysis of displacement and deformation behaviors, make it difficult for the teacher to demonstrate.

This problem also occurs when studying cable structures, for example, flat trusses which are those distributed in a plane, and are generally used in roof and bridge structures. One of the alternatives for behavioral study consists of the 'method of knots', which analysis is carried out from the free body diagram of each node that makes up the truss, or even the method of sections used to determine the forces acting within a truss element.

These conventional methods are difficult for the user to use and perceive. Most of the time the user resorts to using specific computer software. While such software promotes behavioral study, it depends exclusively on the introduction of data, which requires a prior notion of structure, and is therefore inefficient during didactic procedures.

The applicant works in the area of development of architectural and structural educational models and is the applicant of patent document Nos. MU 8602813-8, BR10201503231-8, BR112018009580-0 and PCT BR2016000092. The patent document having the International application number PCT/BR2016/000092 was filed on Sep. 14, 2016, and was published as WO 2018/049489 on Mar. 22, 2018, and this application was entered in the US as US National Stage application Ser. No. 15/749,367, having a US filing date of Jan. 31, 2018, and which was published as US Patent Publication No. US 2019/0197918 with a publication date of Jun. 27, 2019. All of these references in this paragraph are from the same applicant as the present application, and all of said references in this paragraph as described above are all incorporated herein by reference as if set forth in this application in their entirety.

DISCUSSION OF THE PRIOR ART

In a search carried out in specialized databases, documents referring to study methods were found, such as document number CN105243185 that is about Monte Carlo's method, which belongs to the field of static tense structure analysis. The method comprises the following steps: step 1) initial condition; step 2) randomly generating an initial configuration; step 3) randomly generating a new configuration and determining if it accepts the new configuration; step 4) verifying if a system is balanced; and step 5) obtaining a form—finding a result. According to the Monte Carlo method, the basic tensegrity structure solves the calculation of a tensegrity structure, implemented through the use of Matlab® programming, so that a self-balanced configuration can be obtained quickly and accurately, and the effects are significant.

Document number CN108665547 is about a method of finding shapes for a hyperbolic shell spatial grid structure with axial symmetry, comprising the following steps: determining a spatial parameter by dividing a circular arc segment from an upper circle and a lower circle, connecting a spatial straight line, and finding a shape of the spatial grid structure.

Document number PI 0303779-7 is about a didactic pedagogical model comprising a wooden base, where the boards that demonstrate the built site are placed, consisting of parts of different shapes on the boards of the built site. The boards are placed to demonstrate the natural site, also consisting of parts similar to the parts located in its lower part, comprised by the built site.

The documents mentioned in the paragraphs above, despite belonging to the same field of application, do not present any of the characteristics of the improved object, thus ensuring that it meets the legal requirements for patentability.

SUMMARY OF THE INVENTION

An objective of this invention is to present a kit of structural parts for the formation of architectural and structural didactic models, particularly in the form of cables, connections and stiffeners. These structural parts enable the exploration and simulation of cable structures such as girder structures, suspension bridges, cable mesh, tensegrity structures and other types of structural systems.

Another objective of this invention is to present a kit of structural parts for the formation of architectural and structural didactic models, comprising cables with a modular format that is easy to measure and cut.

Another objective of this invention is to present a kit of structural parts for the formation of architectural and structural didactic models comprising cable clip elements that allow the cables to be extended so that a single, elongated cable is formed. The cable clip elements can also be used to form loops in the cables.

It is also the objective of this invention to present a kit of structural parts for the formation of architectural and structural didactic models, where the cable clip elements can connect two cables to in a T-shape. The cable clip elements can also be used to connect cables at different angles and to create cable mesh systems when several cable clip elements are connected to a cable clip ring.

It is also the objective of this invention to present a kit of structural parts for the formation of architectural and structural didactic models, comprising a multiple cable clip part that=connects multiple cables using a single connection.

Another objective of this invention is to present a kit of structural parts for the formation of architectural and structural didactic models, comprising cable connecting parts which connect the cables to a structural spring system. The cable connecting parts also allow the length of the cable to be altered at any time, to make final adjustments in the structure and to give the cable the proper tension, making it precise and easy to assemble.

A further objective of this invention is to present a kit of structural parts for the formation of architectural and structural didactic models, comprising bar stiffeners to transform high deformation bars into rigid elements, thus avoiding the effect of buckling.

It is also the objective of this invention to present a kit of structural parts for the formation of architectural and structural didactic models, comprising other accessory elements such as a cable cutter, an instruction manual, plates and different elements connected using magnets, allowing numerous combinations to be made and allowing the simulation of the structural behavior of cable structures for understanding different structural concepts.

BRIEF DESCRIPTION OF THE FIGURES

FIG. 2 shows a perspective view of the composition of the cable with respective detail.

FIG. 3 shows a perspective view of a first embodiment of the cable clip element.

FIGS. 3A, 3B and 3C show front, side and top views, respectively, of the cable clip element.

FIG. 4H shows different views of several cable clip elements installed on rings of various sizes to form cable mesh systems.

FIGS. 8 to 8B show front and side views of the multiple cable clip part, as well as a front view of the multiple cable clip part, which has been unlocked;

FIG. 8C shows a front view of the multiple cable clip part, which has received multiple cables, coupled to the cable connecting part.

FIG. 10 shows a side view of a model used to study cable behavior, illustrating the mounting of cable connections.

DETAILED DESCRIPTION OF THE INVENTION

With reference to the illustrated drawings, the present invention relates to a structural parts kit for the formation of architectural and structural didactic models. More precisely, the invention is a kit (KT) of structural parts (10) connected by magnets for the assembly of various architectural and structural models (MA) that simulate the structural behavior of real cable structures, thus allowing for the understanding of different structural concepts. The kit (KT) comprises an instruction manual (20), plates (21) and other structural parts (10) that facilitate the learning of the concepts discussed in class through tactile and visual means. Experimenting with various architectural and structural models allows a user to learn about the behavior of the structures.

Figure 5:
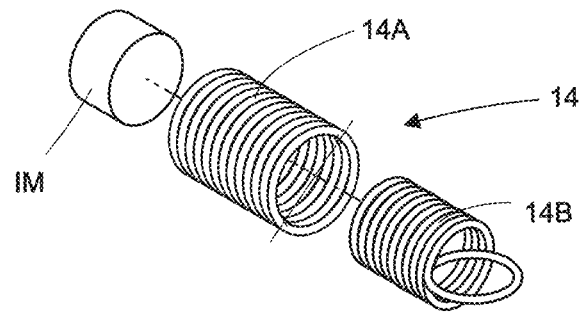
FIG. 5 shows an exploded perspective view of the elements that form the cable connecting part.
Figure 5A:
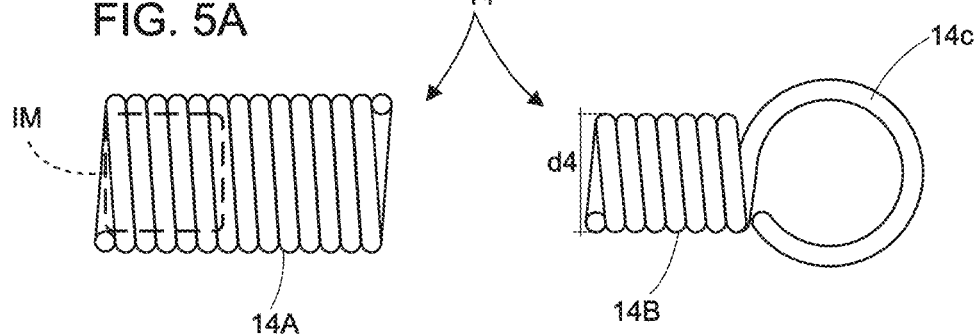
FIG. 5A shows a side view of the elements that make up the cable connecting part.
Figure 5B:
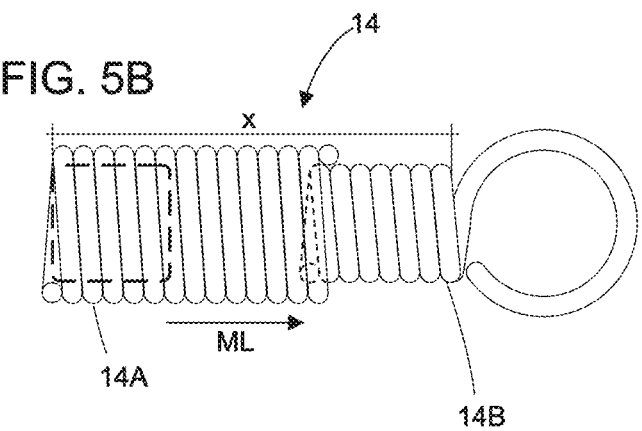
FIGS. 5B and 5C show side views of the elements that make up the cable connecting part when extended and retracted.
Figure 5C:
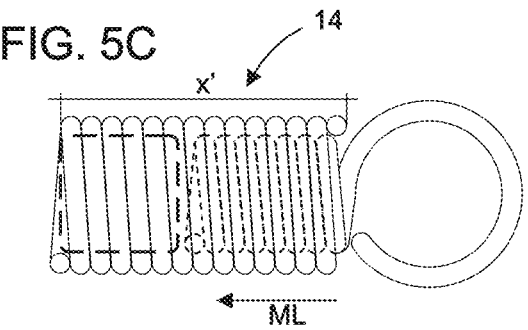
Figure 7:
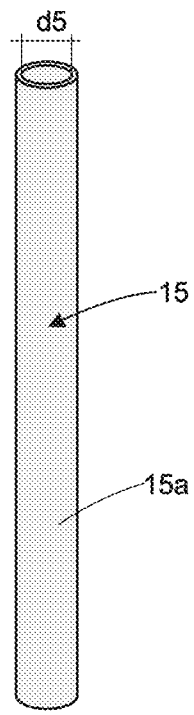
FIG. 7 shows a perspective view of the bar stiffener.
Figure 7A:
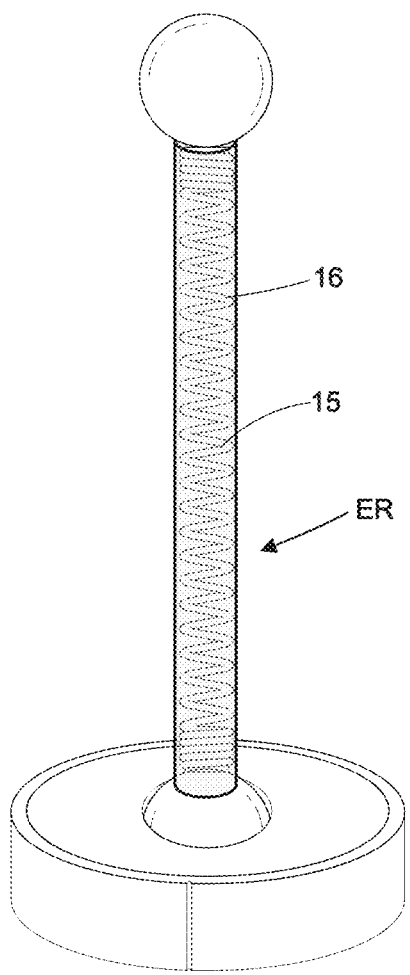
FIG. 7A shows a perspective view of the bar stiffener receiving a high deformation bar to form a rigid element.

According to the present invention, the structural parts (10) comprise: i) metal cables (11) formed by multiple spherical and hollow elements (11a) connected to each other by rods (11b) with limiters (11c) (see FIG. 2); ii) cable clip elements (12) and (13) (see FIGS. 3 to 3E) with upper openings (12a) capable of receiving the spherical elements (11a) of the metal cables (11); iii) cable connecting parts (14) (see FIGS. 5 to 5C) comprised of two linearly movable parts (14) that enable the extension (x) or the retraction (x') of the cable connecting parts (14) to adjust the tension of a cable extending between two cable connecting parts (14); iv) bar stiffeners (15) for high deformation bars (16) (see FIGS. 7 and 7A) to form rigid elements (ER); v) a cable cutter (18); and vi) multiple cable clip parts (19) for receiving multiple metal cables (11) simultaneously.

In a preferred embodiment, each cable clip element (12) (see FIGS. 3 to 3C) comprises a tubular body with a U-shaped section, formed by an upper opening (12a) and two walls (12b) with edges that extend toward one another to form a cover (12c) on each end of the tubular body. The cover (12c), the walls (12b) and a base (12e) of the cable clip element (12) form side openings with a height (at) that enables each of the side openings to receive a spherical element (11a). Each wall (12b) has a longitudinal tear (12d) that forms a convex edge (12d') with arched ends (12d"), configuring hooks that allow the rods (11b) of the cables to pass through.

The base (12e) of the cable clip element (12) comprises a central hole (12e') for the passage of the spherical elements (11a) and the length of the metal cable (11). The base (12e) also comprises oblique bumps (12e") on each end of the tubular body, in line with the covers (12c) to lock the spherical elements (11a) in place.

Figure 4:
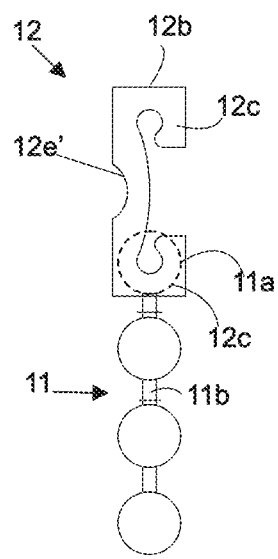
FIG. 4 shows a side view of the cable clip element connected to a cable.

To connect the cables (11) to the cable clip element (12), a spherical element (11a) is inserted into the upper opening (12a) and accommodated in one of the side openings of the cable clip element (12), where the oblique bumps (12e") lock the spherical element (11a) in place (see FIG. 4).

Figure 4A:
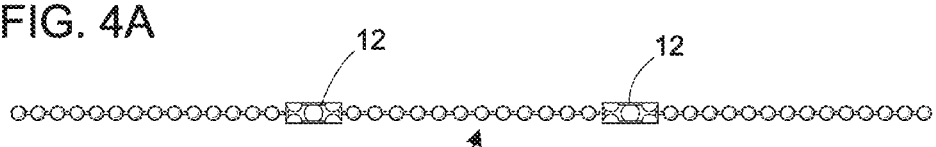
FIGS. 4A and 4B show a top view of the cable clip elements connecting the cables in a linear and a circular configuration, respectively.
Figure 4B:
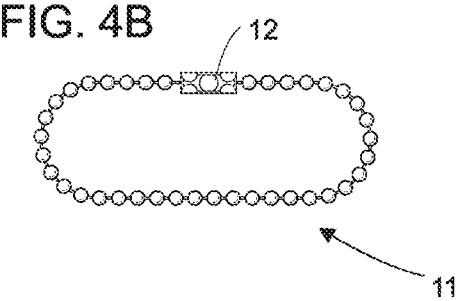
Figure 4C:
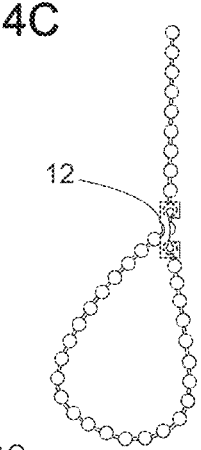
FIG. 4C shows a side view of the cable clip element connecting the cable in a loop configuration.
Figure 4D:
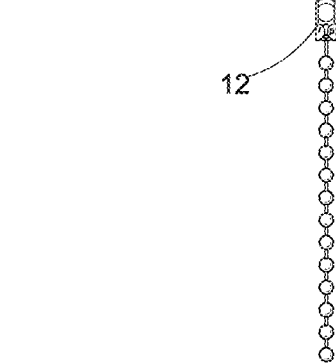
FIG. 4D shows a top view of the cable clip element connecting the cables such that they are perpendicular to one another.
Figure 4E:
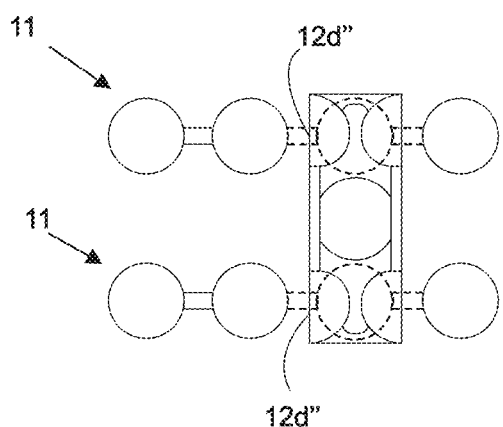
FIG. 4E shows the cable clip element receiving two separate cables positioned parallel to one another.
Figure 4F:
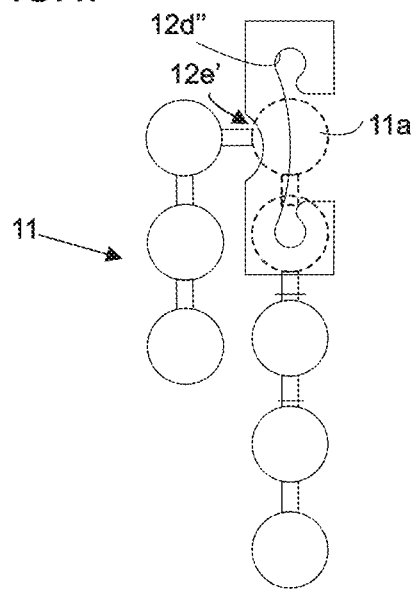
FIG. 4F shows a cable passing through a central hole of the cable clip element and exiting through a side opening of the cable clip element.

The cable clip element (12) (see FIGS. 4A to 4F) has arched ends (12d") formed within the walls (12b) to allow two cables (11) to be arranged at various angles relative to one another. For example, a first cable can be inserted into a first side opening of the cable clip element and a second cable can be inserted into a second side opening of the cable clip element, with the cables arranged such that the first cable is positioned linearly relative to the second cable (see FIG. 4A). The arched ends (12d") also allow a first cable to be arranged perpendicularly relative to a second cable as seen in FIG. 4D. The arched ends (12d") are aligned along the same axis (E1) to allow a first cable to be arranged parallel to a second cable (see FIG. 4E). A cable (11) can also be passed through the central hole (12e"), then through one of the side openings of the cable clip element (12) as shown in FIG. 4F.

Figure 4G:
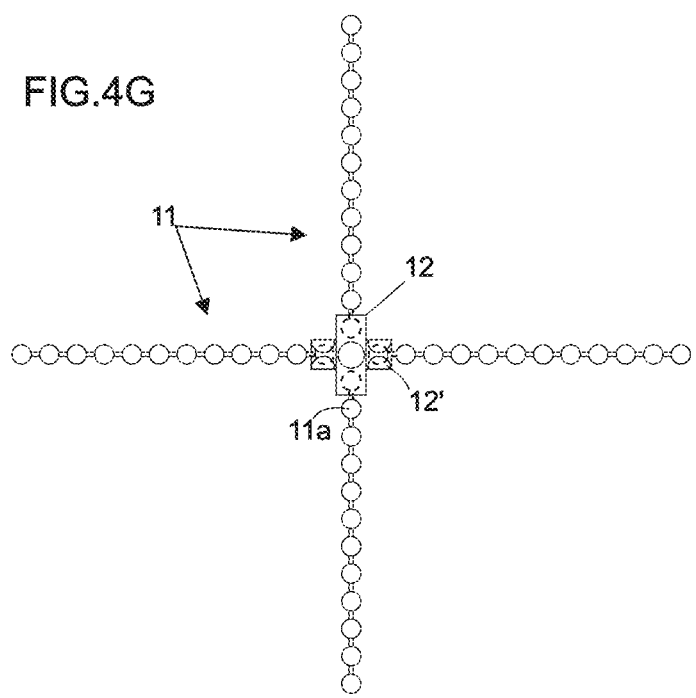
FIG. 4G shows a pair of cable clip elements joined together to make a "cross" shape, increasing the number of cables that can be coupled.

In one embodiment, the cable clip element (12) (see FIG. 4G) can receive a second cable clip element (12'), with respective central holes (12e) overlapping to form a "cross" shape, thus increasing the number of structural parts (10) that can be received by the cable clip elements. A fixing screw is inserted through the central holes (12e) to fix the cable clip elements (12, 12') in place.

The cable clip element (12), specifically the arched ends (12d"), can be mounted to cable clip rings (17) of different diameters for the formation of cable mesh systems (see FIG. 4H).

Figure 1:
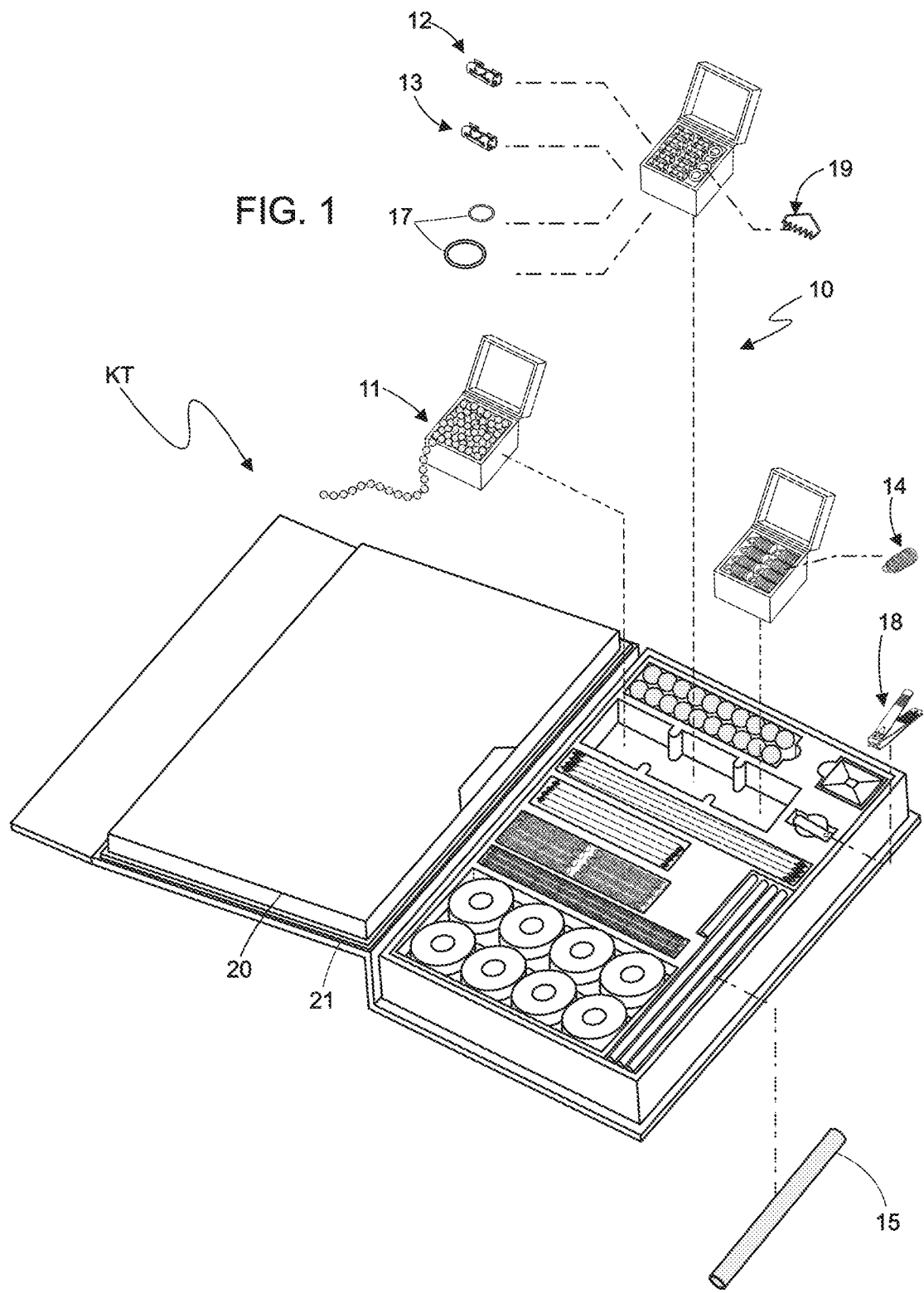
FIG. 1 shows a perspective view of the elements that make up the kit.
Figure 3D:
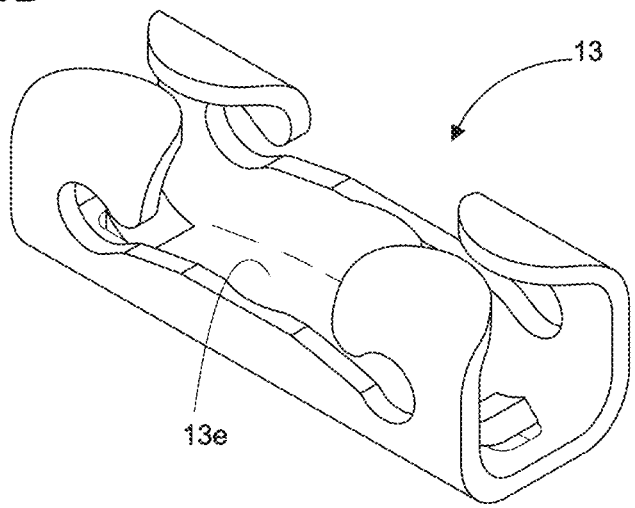
FIGS. 3D and 3E show perspective and top views, respectively, of a variation of the cable clip element.
Figure 3E:
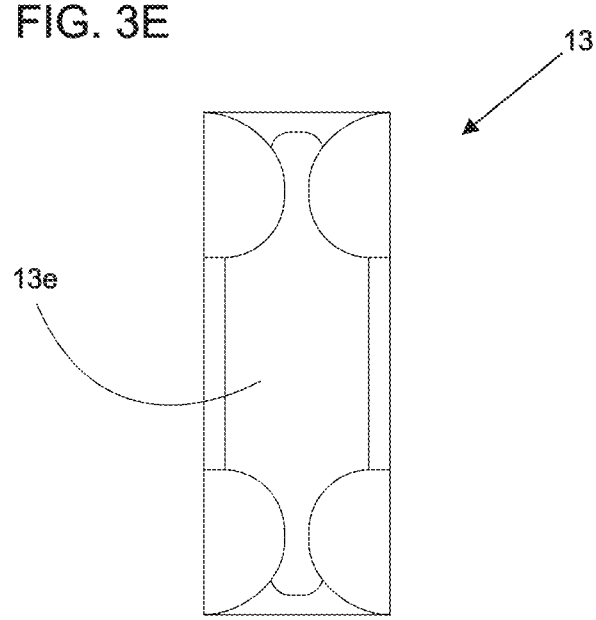

In a variation of the cable clip element (12), FIGS. 3D and 3E show a cable clip part (13) with a similar structure to the cable clip part (12) shown in FIGS. 3 to 3C, but with a flat base (13e), decreasing the number of possible connection points.

The cable connecting part (14) (see FIGS. 5 to 5C) is comprised of two spring parts, a spring portion (14A) and a moving spring part (14B). The spring portion (14A) has an internal diameter (d3) that receives a magnet (IM) for connecting to the structural spring system (SM) and the moving spring part (14B). The moving spring part (14B) has a reduced external diameter (d4) in relation to the internal diameter (d3) of the spring portion (14A) and has a free end formed by a ring (14c).

Figure 6:
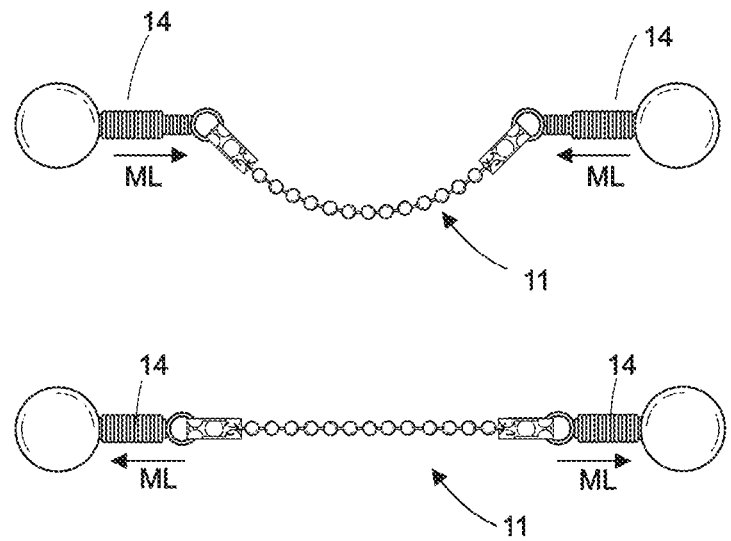
FIG. 6 shows side views of the cable connecting parts connected to the structural spring system, illustrating the how the tension of the cable is adjusted using the cable connecting parts.
Figure 6A:
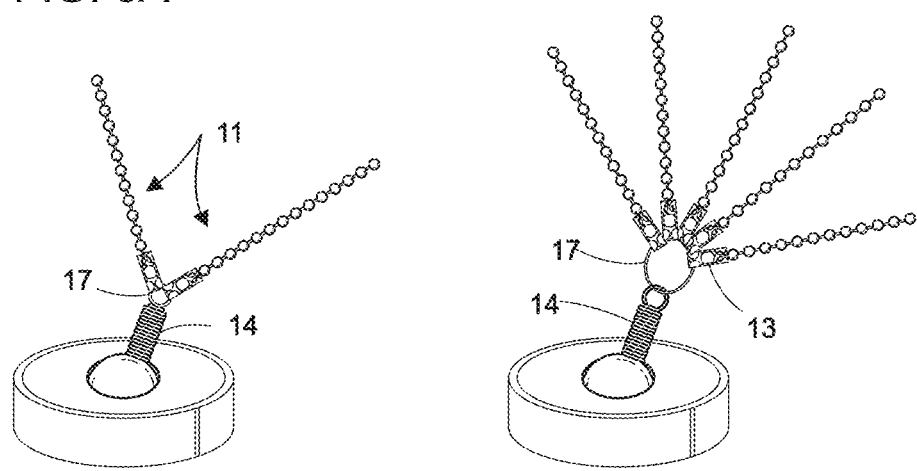
FIG. 6A shows a perspective view of the cable clip elements attaching directly or indirectly to the cable connecting parts, joining several cables.

Threading the moving spring part (14B) into the spring portion (14A) causes linear movement (ML) that results in extension (x) or retraction (x') of the cable connection parts (14) to adjust the tension of a cable extending between two cable connecting parts (see FIG. 6). The ring (14c) may receive one or more cable clip elements (12,13) (see FIG. 6A).

The bar stiffener (15) (see FIGS. 7 and 7A) is made of transparent polymer and has a tubular profile (15a) with an internal diameter (d5) that can receive a high deformation bar (16) in order to form a rigid element (ER).

The multiple cable clip part (19) (FIGS. 8 to 8C) is made of wire or other similar material and comprises a helical spring (19a) with gaps (19b) between each spiral (19a') receives spherical elements (11a) corresponding to at least one cable (11). The spring (19a) extends into an arch (19c) with a tip (19c') coupled to a cable connection part (14). At an opposite end of the arch (19c) is a longitudinal projection (19c") that locks onto the spring (19a) and stabilizes the spherical elements (11a). A length (c) of the spring (19a) is variable such that the helical spring has an increased number of gaps (19b) to enable the coupling of a greater number of cables (11).

The structural parts (10) can be used with the sets of structural parts described in patent documents including Serial numbers MU 8602813-8, BR10201503231-8, BR112018009580-0 and PCT/BR2016/000092 which was filed on Sep. 14, 2016, and was published as WO 2018/049489 on Mar. 22, 2018, and this application was entered in the US as US National Stage application Ser. No. 15/749,367, having a US filing date of Jan. 31, 2018, and which was published as US Patent Publication No. US 2019/0197918 with a publication date of Jun. 27, 2019. All of these references in this paragraph are from the same applicant as the present application, and all of said references in this paragraph as described above are all incorporated herein by reference as if set forth in this application in their entirety.

Figure 9:
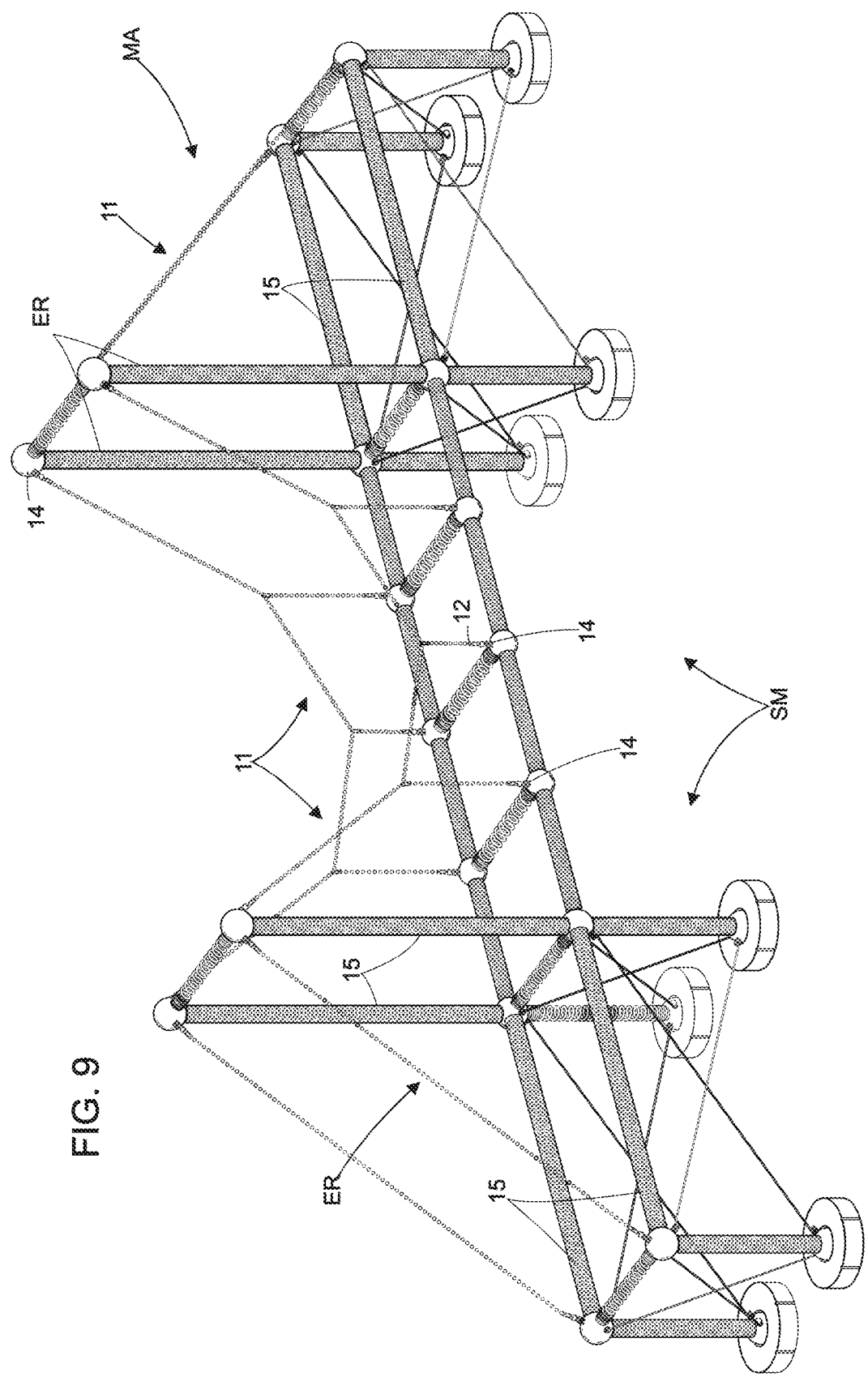
FIG. 9 shows a perspective view of a hanging bridge model, illustrating the cable connections.

Therefore, the structural parts (10) can be used with other elements of the kit (KT) such as plates and other components of parts described in documents No. MU 8602813-8, BR10201503231-8, BR112018009580-0 and PCT BR2016000092 to build models (MA) (see FIGS. 9 and 10).

It should be understood that the preferred embodiments mentioned here are merely illustrative of the present invention. Numerous variations in design and use of the present invention may be contemplated in view of the following claims without straying from the intended scope and field of the invention herein disclosed

The invention claimed is:

1. An architectural mockups kit, having individual structural elements equivalents to conventional parts used in civil construction for approximate obtainment of behavior of a real structure and expected deformations or displacements; the kit comprising:
   (1) a plurality of plastic plates adapted for horizontal, vertical or inclined locking with the individual structural vertical and cross-sectional elements and a plurality of metal cables, simulating slabs, walls and roofs of a construction;
   (2) a plurality of metal cables formed by multiple spherical elements and hollow elements connected to one another by rods with limiters;
   (3) a plurality of cable clip elements, having upper openings that capable of receiving the multiple spherical elements of the metal cables;
   (4) a plurality of cable clip rings of multiple diameters, for mounting with the plurality of cable clip elements for formation of cable mesh systems;
   (5) a plurality of cable connecting elements comprising two linearly movable parts that enable extension and retraction of cable connecting parts, allowing for adjusting the tension of one of a plurality of metal cables extending between two cable connecting parts;
   (6) a plurality of bar stiffeners for high deformation bars to form rigid elements;
   (7) a cable cutter, and
   (8) a plurality of cable clip parts for receiving the plurality of metal cables simultaneously.

2. The architectural mockups kit, according to claim 1, wherein each of the plurality of cable clip elements comprises a tubular body with a base and a U-shaped section formed by an upper opening and two walls with edges that extend toward one another to form a cover on each end of the tubular body;
   wherein the cover, the walls and the base form side openings with a height that enables each of the side openings to receive one of the multiple spherical elements;
   wherein each wall has a longitudinal tear that forms a convex edge with arched ends, configuring hooks that allow the rods of the cables to pass through; and
   wherein the base comprises a central hole for the passage of the multiple spherical elements and a length of the cable, and oblique bumps located at each end of the tubular body, in line with the covers, to lock the multiple spherical elements in place.

3. The architectural mockups kit, according to claim 2, wherein a first of one of the plurality of cables is inserted into a first side opening of one of the plurality of cable clip elements and a second of one of the plurality of cables is inserted into a second side opening of one of the plurality of the cable clip elements, and the first cable and second cable are arranged such that the first cable is positioned linearly relative to the second cable.

4. The architectural mockups kit, according to claim 2, wherein the arched ends on the walls allow a first of one of the plurality of cables to be arranged perpendicularly relative to a second of one of the plurality of cables.

5. The architectural mockups kit, according to claim 2, wherein the arched ends on each wall are aligned along a same axis to allow a first of one of the plurality of cables to be arranged parallel to a second of one of the plurality of cables.

6. The architectural mockups kit, according to claim 2, wherein a first one of the plurality of the cable clip elements receives a second one of the plurality of the cable clip elements with respective central holes overlapping to form a "cross" shape; and
wherein a fixing screw is inserted through the central holes to fix the first of one of the plurality of the cable clip elements and the second of one of the plurality of the cable clip elements in place.

7. The architectural mockups kit, according to claim 2, wherein the arched ends of the walls are mountable to the plurality of cable clip rings of different diameters to form cable mesh systems.

8. The architectural mockups kit, according to claim 1, wherein each of the plurality of the cable clip elements comprises a tubular body with a flat base and a U-shaped section formed by an upper opening and two walls with edges that extend toward one another to form a cover on each end of the tubular body; wherein the cover, the walls and the base form side openings with a height that enables each of the side openings to receive one of the multiple spherical elements; wherein each wall has a longitudinal tear that forms a convex edge with arched ends, configuring hooks that allow the rods of the cables to pass through; and wherein the base comprises oblique bumps on each end of the tubular body, in line with the covers, to lock the multiple spherical elements in place.

9. The architectural mockups kit, according to claim 1, wherein each of the plurality of cable connected parts comprises two spring parts, a spring portion and a moving spring part; the spring portion having an internal diameter that receives a magnet for connecting to a spring system and the moving spring part; the moving spring part having a reduced external diameter in relation to the internal diameter of the spring portion and a free end formed by a ring; wherein threading the moving spring part into the spring portion causes linear movement that results in extension or retraction of the plurality of cable connection parts to adjust a tension of a cable extending between two of the plurality of cable connecting parts; and wherein the ring of the moving spring part is capable of receiving one or more of the plurality of cable clip elements.

10. The architectural mockups kit, according to claim 1, wherein each of the plurality of bar stiffeners is made of transparent polymer and has a tubular profile capable of receiving a high deformation bar to form a rigid element.

11. The architectural mockups kit, according to claim 1, wherein each of the plurality of cable clip parts is made of wire and comprise a helical spring with gaps between each spiral of the helical spring that receives the multiple spherical elements corresponding to at least one cable; the spring extends into an arch with a tip coupled to a cable connection part; and at an opposite end of the arch is a longitudinal projection that locks onto the spring and stabilizes the multiple spherical elements.

12. The architectural mockups kit, according to claim 11, wherein a length of the helical spring is variable so that the helical spring has an increased number of gaps to enable coupling of a greater number of cables.

13. An architectural mockups kit, having individual structural vertical and cross-sectional elements equivalents to conventional parts used in civil construction for approximate obtainment of behavior of a real structure and expected deformations or displacements; the kit comprising:
(1) a plurality of units of adjustable bars idealized for length adjustment, enabling mounting dimensional variations in the architectural mockups kit; the units consisting of a pair of segments of helical and cylindrical metal springs of similar or different lengths, and a plurality of coils of different diameters; each segment of the springs having coil pitches sized for enabling an interlock between the segments of the springs during adjustment of the plurality of units of adjustable bars, through a coupler; and each segment of the springs having a deformed free end configuring a corresponding coupler, and ends opposite to the coupler having units of magnets enabling the springs to join other structural elements,
wherein, the deformed free ends are coupled together for coupling the springs; telescopically threading the deformed free ends of both of the pair of segments of the springs until one of the plurality of units of adjustable bars reaches a desired length, for reducing the length; or telescopically unthreading both springs on a same longitudinal axis for increasing the length of one of the plurality of units of adjustable bars, enabling extension adjustment or reduction of the units for a desired length or height, and
wherein the plurality of units of adjustable bars are coupled to form beams and pillars;
(2) a plurality of connections, comprising: labeled connections consisting of hollow or solid metal balls with magnets; discoid plate base connections; and rigid connections consisting of trapezoidal-shape, a first triangular-shape, a second triangular-shape and inverted Y-shaped continuous connections; wherein the trapezoidal-shape, the first and second triangular-shape and the inverted Y-shaped connections having at least three flat sides and having interconnection magnets housed in recesses on at least on one flat sides, for mounting with the units of magnets of the coupler;
(3) a metal plate adapted to have multiple shapes simulating a ground where the structural elements will be built; the metal plate connected to the structural elements by a connector;
(4) a plurality of metal cables simulating bracings and tie rods;
(5) a plurality of plastic plates adapted for horizontal, vertical or inclined locking with the individual structural vertical and cross-sectional elements and a plurality of metal cables, simulating slabs, walls and roofs of a construction;
(6) a plurality of metal cables formed by multiple spherical elements and hollow elements connected to one another by rods with limiters;

(7) a plurality of cable clip elements, having upper openings that are capable of receiving the multiple spherical elements of the metal cables;

(8) a plurality of cable clip rings of multiple diameters, for mounting with the plurality of cable clip elements for formation of cable mesh systems;

(9) a plurality of cable connecting elements comprising two linearly movable parts that enable extension and retraction of the plurality of cable connecting parts, allowing for adjusting the tension of a cable extending between two of the plurality of cable connecting parts;

(10) a plurality of bar stiffeners for high deformation bars to form rigid elements;

(11) a cable cutter;

(12) a plurality of cable clip parts for receiving the plurality of metal cables simultaneously.

14. The architectural mockups kit, according to claim 13 further comprising a compact rectangular box with hinged lid, and an instruction manual containing illustrations of possible structures obtained with arrangements of the individual structural vertical and cross-sectional elements.

15. The architectural mockups kit, according to claim 13 wherein the segments of springs of the plurality of units of adjustable bars having a circular section that fits through the deformed free ends, threading them together and intercalating respective coils of the corresponding and identical deformed free ends to one another; and wherein the circular section having a reduced diameter and increased pitches, in relation to the pitches of the ends opposite to the coupling.

16. The architectural mockups kit, according to claim 13 wherein the segments of springs of the plurality of units of adjustable bars having a circular section that fits through the deformed free ends, threading them together and intercalating respective coils of the corresponding and identical deformed free ends to one another; and wherein, the circular section is a hook-shape section.

17. The architectural mockups kit, according to claim 13 wherein the segments of springs of the plurality of units of adjustable bars, having the deformed free end formed by extended and straight parts coated with a tubular cover with a diameter that is reduced in relation to a diameter of the coils; the tubular cover, made of resilient material, serving as a guide during threading of the segments of springs to maintain the concentricity of the springs for extension adjustment or reduction of a desired length or height of the plurality of units of adjustable bars.

18. The architectural mockups kit, according to claim 13 wherein the segments of springs of the plurality of units of adjustable bars, having a flexible hose embedded along its length, made of resilient material, with a diameter that is reduced in relation to a diameter of the coils; the flexible hose serving as a guide during threading of the segments of springs to maintain the concentricity of the springs for extension adjustment or reduction of the plurality of units of adjustable bars for a desired length or height; and wherein the deformed free end is formed with a short bend on the coil, towards an axis of the segments of springs forming a shield for preventing the displacement the flexible hose.

19. The architectural mockups kit, according to claim 13 wherein the plates have recesses and X-shaped grooves on a lower side and chamfered edges.

20. The architectural mockups kit, according to claim 13 wherein the discoid plate base connections consisting of a discoid plate, a peripheral wall having multiple longitudinal recesses, a recessed lower side having four ring areas interconnected by cross-sectional and longitudinal grooves; each ring area having a housing adapted to hold a respective magnet; and an upper side having a central recess adapted to hold a steel ball.

21. The architectural mockups kit, according to claim 13 wherein the first triangular-shape continuous connections having a body, with four peripheral sides, the sides having a housing adapted to hold a respective magnet.

22. The architectural mockups kit, according to claim 13 wherein the second triangular-shape continuous connections having a body with at least two opposite sides, the sides having a housing adapted to hold a respective magnet.

23. The architectural mockups kit, according to claim 13 wherein the trapezoidal-shape continuous connections having a body with side walls and a base side; the base side with a central cutout, the base side and the cutout with housings for mounting a magnet.

24. The architectural mockups kit, according to claim 13 wherein the inverted Y-shaped continuous connections having a body with an inverted Y-shape cutout with side walls to form a split base with two flat sides, both sides having a housing adapted to hold a respective magnet.

25. The architectural mockups kit, according to claim 13 wherein each cable clip element comprises a tubular body with a base and a U-shaped section formed by an upper opening and two walls with edges that extend toward one another to form a cover on each end of the tubular body; the walls and the base form side openings with a height that enables each of the side openings to receive one of the multiple spherical elements; each wall has a longitudinal tear that forms a convex edge with arched ends, configuring hooks that allow the rods of the cables to pass through; and the base comprises a central hole for the passage of the multiple spherical elements and a length of the cable, and oblique bumps located at each end of the tubular body, in line with the covers, to lock the multiple spherical elements in place.

26. The architectural mockups kit, according to claim 13 wherein a first cable is inserted into a first side opening of one of the plurality of cable clip elements and a second cable is inserted into a second side opening of one of the plurality of cable clip elements, and the first cable and second cable are arranged such that the first cable is positioned linearly relative to the second cable.

27. The architectural mockups kit, according to claim 13 wherein the arched ends on the walls allow a first cable to be arranged perpendicularly relative to a second cable.

28. The architectural mockups kit, according to claim 13 wherein the arched ends on each wall are aligned along a same axis to allow a first cable to be arranged parallel to a second cable.

29. The architectural mockups kit, according to claim 13 wherein a first of one of the plurality of cable clip elements receives a second of one of the plurality of cable clip elements with respective central holes overlapping to form a "cross" shape.

30. The architectural mockups kit, according to claim 13 wherein a fixing screw is inserted through the central holes to fix a first of one of the plurality of cable clip elements and a second of one of the plurality of cable clip elements in place.

31. The architectural mockups kit, according to claim 13 wherein the arched ends of the walls are mountable to one of the plurality of cable clip rings of different diameters to form cable mesh systems.

32. The architectural mockups kit, according to claim 13 wherein one of the plurality of cable clip elements comprises a tubular body with a flat base and a U-shaped section formed by an upper opening and two walls with edges that extend toward one another to form a cover on each end of the tubular body; wherein the cover, the walls and the base form side openings with a height that enables each of the side openings to receive one of the multiple spherical elements; wherein each wall has a longitudinal tear that forms a convex edge with arched ends, configuring hooks that allow the rods of the cables to pass through; and wherein the base comprises oblique bumps on each end of the tubular body, in line with the covers, to lock the multiple spherical elements in place.

33. The architectural mockups kit, according to claim 13 wherein the plurality of cable connecting parts comprises two spring parts, a spring portion and a moving spring part; the spring portion having an internal diameter that receives a magnet for connecting to a spring system and the moving spring part; the moving spring part having a reduced external diameter in relation to the internal diameter of the spring portion and a free end formed by a ring; wherein threading the moving spring part into the spring portion causes linear movement that results in extension or retraction of the plurality of cable connection parts to adjust a tension of a cable extending between two of the plurality of cable connecting parts; and wherein the ring of the moving spring part is capable of receiving one or more of the plurality of cable clip elements.

34. The architectural mockups kit, according to claim 13 wherein one of the plurality of bar stiffeners is made of transparent polymer and has a tubular profile capable of receiving a high deformation bar to form a rigid element.

35. The architectural mockups kit, according to claim 13 wherein the plurality of cable clip parts are made of wire and comprise a helical spring with gaps between each spiral of the helical spring that receives one of the multiple spherical elements corresponding to at least one cable; the spring extends into an arch with a tip coupled to none of the plurality of cable connection parts; and at an opposite end of the arch is a longitudinal projection that locks onto the spring and stabilizes the multiple spherical elements.

36. The architectural mockups kit, according to claim 35, wherein a length of the helical spring is variable such that the helical spring has an increased number of gaps to enable coupling of a greater number of cables.

\* \* \* \* \*